United States Patent [19]

Long

[11] Patent Number: 5,225,817
[45] Date of Patent: Jul. 6, 1993

[54] ELETRONIC GRAPHIC SYSTEMS

[75] Inventor: Robert J. Long, Spring Cottage, United Kingdom

[73] Assignee: Quantel Limited, Newbury, England

[21] Appl. No.: 594,069

[22] Filed: Oct. 9, 1990

[30] Foreign Application Priority Data

Oct. 13, 1989 [GB] United Kingdom ............... 8923091

[51] Int. Cl.$^5$ ........................................... G11B 31/00
[52] U.S. Cl. ..................................... 340/703; 358/79
[58] Field of Search .................. 358/79, 78, 80, 432; 382/17; 340/703

[56] References Cited

U.S. PATENT DOCUMENTS

| | | | |
|---|---|---|---|
| 4,514,818 | 4/1985 | Walker | 364/521 |
| 4,602,286 | 7/1986 | Kellar et al. | 358/183 |
| 4,721,951 | 1/1988 | Holler | 340/703 |
| 4,953,013 | 8/1990 | Tsuji et al. | 358/80 |

FOREIGN PATENT DOCUMENTS

| | | |
|---|---|---|
| 0175066 | 3/1986 | European Pat. Off. . |
| 0178047 | 4/1986 | European Pat. Off. . |
| 0245943 | 11/1987 | European Pat. Off. . |
| 1422904 | 1/1976 | United Kingdom . |
| 1449126 | 9/1976 | United Kingdom . |
| 2077548 | 12/1981 | United Kingdom . |

Primary Examiner—Jeffery A. Brier
Assistant Examiner—A. Au
Attorney, Agent, or Firm—Cooper & Dunham

[57] ABSTRACT

An electronic graphic system is arranged such that data relating to the black separation of an image is made available for modification independently from other data representing the image. In a preferred embodiment black separation data is written into a monochrome framestore 8 and modifications to the separation can be effected by way of a stylus and touch tablet combination 6 and associated drawing circuitry 16.

25 Claims, 3 Drawing Sheets

ELETRONIC GRAPHIC SYSTEMS

The invention relates to electronic graphic systems.

BACKGROUND OF THE INVENTION

Electronic graphic systems in which the painting of a colour picture can be simulated by electronic means are known. One such system is described in our British Patent No. 2,089,625 and corresponding U.S. Pat. No. 4,514,818, the teachings of which are incorporated herein by reference. This system includes means by which the user can select from a range of colours, and a stylus and touch tablet combination for defining a point or a stroke on a picture being "painted". The stylus and touch tablet combination generates position signals representing the position of the stylus on the tablet which are translated into addresses in a store that stores signals (pixels) representing the colour being painted. New pixels are derived by a processing circuit in accordance with the selected colour, the distribution of a notional drawing implement selected by the user from a range of predefined implements, pressure applied to the stylus and the value of pixels previously held in the store, as described in the aforesaid patents. In this way the user can build up a picture as a sequence of signals representative thereof which are stored in the store and from there can be displayed on a TV type colour monitor.

Another system which includes additional means to enable a user to perform picture composition in addition to painting is described in our British Patent No. 2,113,950 and corresponding U.S. Pat. No. 4,602,286 the teachings of which are also incorporated herein. In this system, storage means are provided for storing two independent pictures which are combined under the users control by way of a control image or stencil held in a stencil store. A picture is produced by drawing pixels into the stencil store and using these pixels as an interpolation coefficient to control the combining of the two independent pictures.

Once a picture has been created to the user's satisfaction it can be printed. Printing of the picture normally involves the use of subtractive inks, namely cyan, magenta and yellow which are applied to a receiving medium in the form of dots which vary in size according to the intensity of a colour to be reflected from the medium. Areas of black in the picture can be printed by combining the cyan, magenta and yellow (CMY) inks but this can with some inks result in the black areas being seen as a brown colour rather than black in the printed picture. In order to overcome this it is common practice additionally to apply black (K) ink to the receiving medium.

In contrast to this, when a picture is displayed on a colour monitor the colour of each picture point is defined by the proportion of red, green and blue (RGB), i.e. additive colours, emitted from the display screen. Accordingly the system of the abovementioned patents is arranged to display pictures using data defining colours in terms of RGB components.

It is well known that in practice the relationship between the colours in a picture displayed on a monitor using RGB and the colours in a picture printed on a medium using CMY is non-linear and that there is a substantial range of colours which can be displayed on a monitor but which cannot be reproduced satisfactorily using CMY printing inks. Indeed, our own European patent application published as EP-A-0,245,943, the teachings of which are incorporated herein by reference, discloses a system comprising a colour conversion circuit for converting between RGB and CMY format for use at different parts in the system. The conversion circuit comprises a matrix of arithmetic circuits including look up tables which compensate for imperfections etc. in the printing inks when calculating the conversion between RGB and CMY.

Pictures to be modified can be input to our electronic graphic systems from any of a number of suitable sources. For example one source which is commonly used is a graphic art scanning machine which scans, say, a photograph and derives colour pixel data therefrom for delivery to another device, e.g. an electronic graphic system or a printer, for further use. Most scanning machines, and indeed many other sources in common use in the field of graphic art printing, present pixel data in CMYK format and it is therefore necessary to be able to convert this data to RGB format before it is used in our electronic graphic systems. Once the image data has been modified using our electronic graphic systems it is converted back into CMYK format for printing.

FIG. 1 of the accompanying drawings shows in schematic block diagram form the configuration that we have hitherto used in our electronic graphic systems to enable the user to make modifications to an original picture presented in CMYK format, before it is printed. In the system of FIG. 1 a source 1, which may for example be an image scanner or a disc storage device, delivers picture data as pixels in CMYK format to a conversion matrix circuit 2 which is arranged to convert the CMY data to corresponding RGB data. The conversion matrix circuit 2 may be of the kind described in our European Patent Application published as No. 245,943 the teachings of which form part of the present disclosure. It will be noted that the black (K) content of the pixel data from the source 1 is ignored by the converter circuit 2 and is therefore lost.

RGB data output from the conversion matrix circuit 2 is stored in a first colour framestore 3 for manipulation by the user. In the following description framestores will mainly be referred to either as monochrome framestores or as colour framestores. In the system shown in FIG. 1, and in the system according to the present invention to be described in greater detail hereinafter, colour pictures are defined using three bytes one each for the R, G and B, or C, M and Y, components. In the case of control image data or single colour separation data only one (monochrome) byte is required to define the data. Thus, a colour framestore is one having the capacity to store three bytes of data for each pixel whereas a monochrome framestore is one having the capacity to store a single byte for each pixel. The system configuration of FIG. 1 also includes a stylus/touch tablet device 6 by which the artist may modify the displayed image shown on the monitor 5. As the stylus is drawn across the tablet by the artist a number of signals are output from the device. Signals XY representative of the instantaneous position of the stylus on the tablet are output to a patch address generator 7. The patch address generator 7 converts the XY co-ordinate information from the tablet into a corresponding location, i.e. picture point, address in a framestore 8 and defines a patch of pixels about that location. It will be appreciated from a reading of our abovementioned British and U.S. Pat. Nos. that the framestore 8 may be used to store a colour image drawn by the user and that under these circumstances the framestore 8 will be a colour framestore, such as colour framestore 3. However, for the sake of clarity in this example it will be assumed that the framestore 8 is to be used to store a control image or stencil drawn by the user and accordingly that the framestore 8 is a monochrome framestore. Notional drawing implements are used to draw images into the monochrome framestore 8 and the system may be arranged such that after each update of the framestore 8 incremental movements of the stylus over the touch tablet are integrated until they exceed one picture point or similar spacing and then the framestore is again updated by stamping a modified patch of pixels in the framestore 8. A signal representing the instantaneous pressure of the stylus on the touch tablet is also delivered to a stylus pressure register 9.

A set of artist selectable notional drawing implements are each stored in a brush shape memory 10 as a numerical representation of a continuous three dimensional shape which covers a patch of image pixels. The address signal output from the patch address generator 7 is also used to synchronise addressing of the stylus pressure register 9 and the brush shape memory 10. Selection means (not shown in FIG. 1) are provided to allow the artist to select one of the drawing implements from the set.

In use data output from the stylus pressure register 9 and the brush shape memory 10 as the artist moves the stylus across the touch table are multiplied together to produce a coefficient for use by a brush processor circuit 11.

The brush processor circuit 11 performs a continuously cycling read-modify-write operation on the image data in the stencil framestore 8 on a pixel-by-pixel basis. Image data is extracted from the framestore 8 and is negatively summed with, i.e. subtracted from, a preset image intensity value held in an intensity register 12 by a summing unit 13 (.e.g. a 74S381 device). The resulting sum output from the summing unit 13 is multiplied with the interpolation coefficient by way of a multiplying unit 14 (e.g. a MPY-8HuJ/TRW device) and the resulting product is then added to the data extracted from the framestore 8 by way of an adding unit 15 (e.g. a 74S38i device). The data output from the adding unit is then written back into the framestore 8, replacing the original data in the framestore 8.

Although the read-modify-write process is executed in a continuous cycle on the data held in the framestore, it should be apparent that the data will only be modified when the artist is drawing on the touch tablet with the stylus. When the artist is not using the stylus/touch tablet device under pressure the data in the framestore 8 will remain unaltered and no read-modify-write cycles are performed. This method of processing data drawn into the framestore 8 avoids the problem of jagged edges by producing non-stepped boundary profiles.

The patch address generator 7, the stylus pressure register 9, the brush shape memory 10, the brush processor 11, and the intensity register 12 together form circuitry which will hereinafter be referred to as "drawing circuitry 16".

As has already been noted above, the drawing circuitry 16 can be used to modify directly RGB picture data in the colour framestore 3 by arranging for the drawing circuitry 16 to be connected to the colour framestore 3 instead of to the monochrome framestore 8. However, in this example, it will be assumed that the user wishes to combine data relating to another image with the data in the colour framestore 3 by way of a control image drawn into the monochrome framestore 8.

The control image in the monochrome framestore 8 is used together with a processor 17 to modify the RGB picture data in the first colour framestore 3. With the system configured in a drawing mode, RGB picture data from the first framestore 3 is output to the processor 17 together with other image data. The image data may be other RGB picture data delivered from a bulk storage device 18 and stored in a second framestore 19. The bulk storage device 18 may for example be a multi-disc store adapted to store picture data. The processor 17 is arranged to interpolate the original RGB picture data from the first framestore 3 with that from the framestore 19, such that the data from each are selectively combined on a pixel-by-pixel basis in accordance with the control image data in the monochrome framestore 8. The control image data is used as an interpolation coefficient 1 to determine the contribution from the original RGB picture data and from the other RGB data. The thus modified pixels output from the processor 17 are written back into the first framestore 3 and in this way the original RGB picture data is modified. Modified pixel data output from the processor 17 is also written to a view framestore 20 and from there is delivered to a monitor 21 for display, thereby to enable the user to view modifications as they are made.

Once a modified picture satisfactory to the user, as displayed on the monitor 21, has been achieved, the modified RGB picture data is output from the first framestore 3 to a conversion matrix circuit 22 which converts each pixel from data in RGB format to corresponding data in CMY format. The conversion matrix circuit 22 performs the opposite function to that of the conversion matrix circuit 2. The CMY data output from the conversion matrix circuit 22 is input to a matrix circuit 23 which is arranged to derive the black (K) separation which is required for printing. The black (K) separation can be calculated in a number of methods each of which are per se well known. For example, one method which may be used in the matrix circuit 23 is to derive a so-called "skeleton black" as the black separation. Each colour component of the CMY data will be represented as a certain level of intensity below or equal to the maximum intensity for that component. To calculate the "skeleton black" the colour component with the lowest intensity is first identified. The intensity value of that colour component is then used to identify a point on a look up table and the corresponding "skeleton black" value is determined therefrom.

Another method which may be used in the matrix circuit is the so called "grey component replacement GCR method. The GCR method starts from the basis that the greyness (black contribution) of an image is determined by approximately equal contributions from each of the CMY components. In practice the cyan component is usually weighted more heavily than the magenta and yellow components to compensate for inadequacies in the printed cyan ink. The component with the lowest intensity value is identified and the value of intensity of that component is deemed to be the value for which equal contribution to the greyness from each component are made. The values are then used to identify a point on a look up table and the grey component is determined therefrom. The intensity values of the colour components is also adjusted by for example subtracting the equal contribution value from each of them to compensate for the extra, i.e. black, ink that will be printed in the printed image. Any other suitable known method of deriving the black (K) separation may instead be used in the matrix circuit 23, but the above mentioned "skeletonblack" method is preferred because it does not require any modifications to be made to the CMY data.

The black (K) separation and the CMY data representing respectively the cyan, magenta and yellow separations are delivered to a further storage means or directly to a printer (neither of which are shown) for storage or printing of the image as required.

The above discussed system configuration shown in FIG. 1 in most circumstances provides data which can be used to print a colour picture which will be satisfactory to the user. However, errors can be introduced when a picture is converted from CMY to RGB and back to CMY because there are many different ways in which the black separation may be defined. It would be difficult to store all methods and/or variations of parameters associated with each method in order to cover all eventualities.

Other errors can be introduced by the very nature of the picture. For example, in an image in which adjacent areas have complementary colours, for example red and cyan, the boundary between these areas will be clearly visible as a grey line. One reason for this is because our electronic graphic systems define changes between colour areas as a gradually changing curve. The curve starts with one colour and ends with the other and between these two colours includes increasing and decreasing contributions from each. When the two colours are complementary, the effect of adding them together will be to cancel out the colour so that only a black component, i.e. no colour, remains.

Furthermore, when the RGB version of the picture data is modified, the black separation will also be changed and it is not possible simply to store the original black for later use in printing the modified image. Nor is it possible simply to replace the original black component in the modified areas with the black component of the modified area because the black component of the modified area will almost certainly be derived in a different manner to that of the black component of the original image and this will make any such modifications visible in the final image.

The invention resides in the realization that there is a need for a system in which black separation data is made available for modification independently from the remaining data representing the image. In this way a user would be able to make modifications only to the black separation or to a black separation derived from data relating to a modified image or images prior to printing the image.

There is also a need for a system in which a picture originally represented by pixel data in CYMK format, converted to RGB format to effect changes to the picture and then converted back to CMYK format for printing can be further edited to modify features or remove unwanted features from the black (K) separation before printing.

Furthermore, it would be desirable to provide a system in which an operator controlled arrangement is provided to enable selective modification of data representing a black separation.

In one aspect the present invention provides an electronic graphic system for use in modifying original black and colour separation data defining an image, in which system the black separation data is stored whilst the original colour separation data is modified to produce modified colour separation data and, once desired modifications to the colour separation data have been achieved, black separation data is derived from the modified colour separation data, and wherein the original black separation data and/or the derived black separation data can be selectively modified by the user to produce modified black separation data which is output together with the modified colour separation data for use in for example printing a modified image.

In another aspect the present invention provides an electronic graphic system for use in modifying black and colour separation data defining an image, the system comprising, first monochrome storing means for storing the black separation data, first colour storing means for storing the colour separation data, modifying means for selectively modifying the colour separation data and means for deriving therefrom derived black separation data to be stored in a second monochrome store means, said modifying means being adapted to enable the original black separation data and/or the derived black separation data also to be modified, and means for outputting the modified black separation data and the modified colour separation data.

In a further aspect of the invention there is provided an electronic graphic system comprising image processing means for creating or modifying an initial image represented by colour separation pixel data without black separation date, means for deriving black separation pixel data pertaining to the image created or modified by said image processing means, and operator controlled modifying means for selectively modifying said derived black separation data.

The invention in another aspect provides an electronic graphic system for use in modifying image data prior to printing the image represented by the data, in which system data relating to the black separation of the image is made available for modification independently from the remaining data representing the image.

The above and further features and advantages of the invention will become clearer from consideration of the following detailed description of an exemplary embodiment of the invention given with reference to the accompanying drawings.

DETAILED DESCRIPTION OF THE PREFERRED EMBODIMENT

Figure 1:
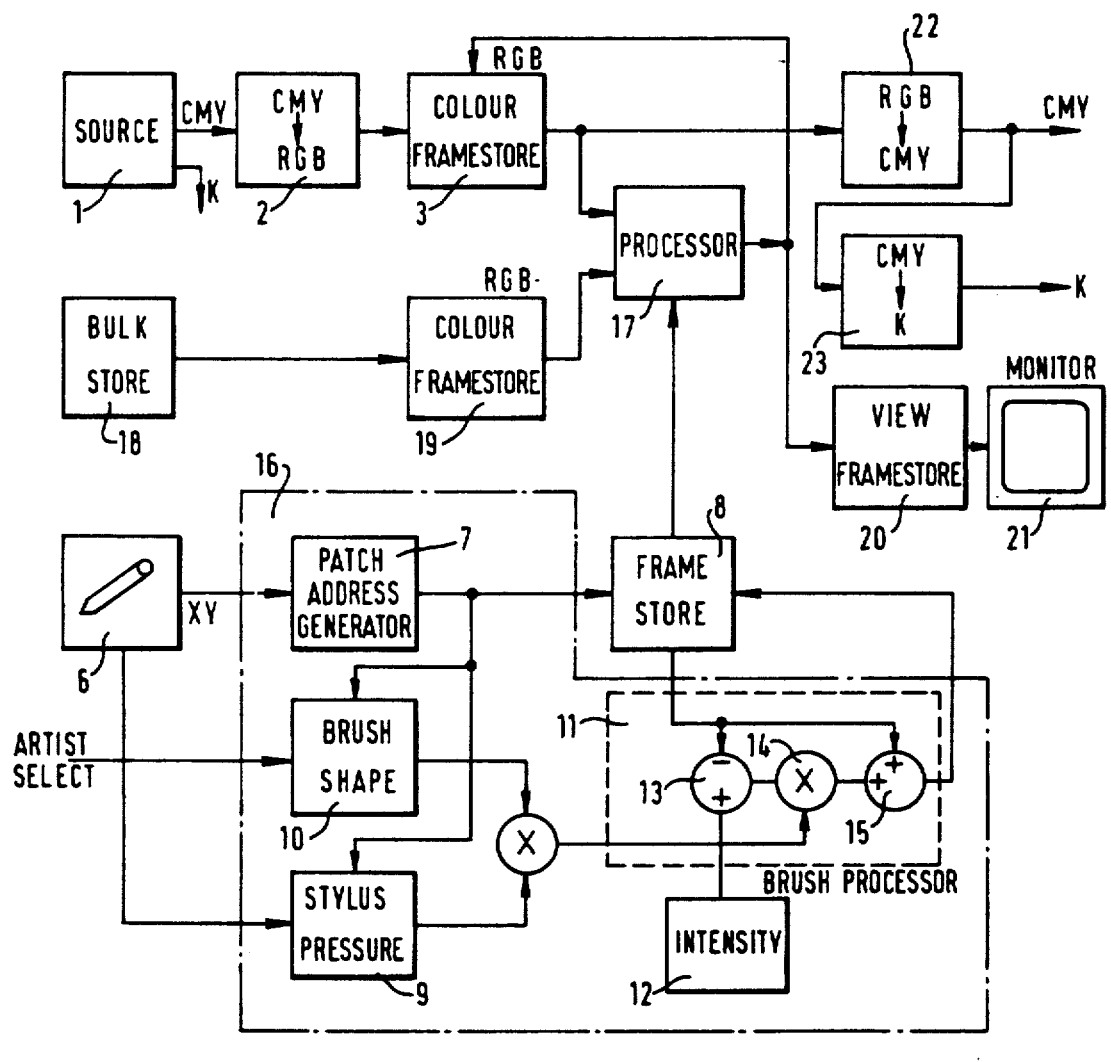
FIG. 1 is a schematic block diagram of a system previously used to make modifications to a picture before printing as has already been described hereinabove.
Figure 2:
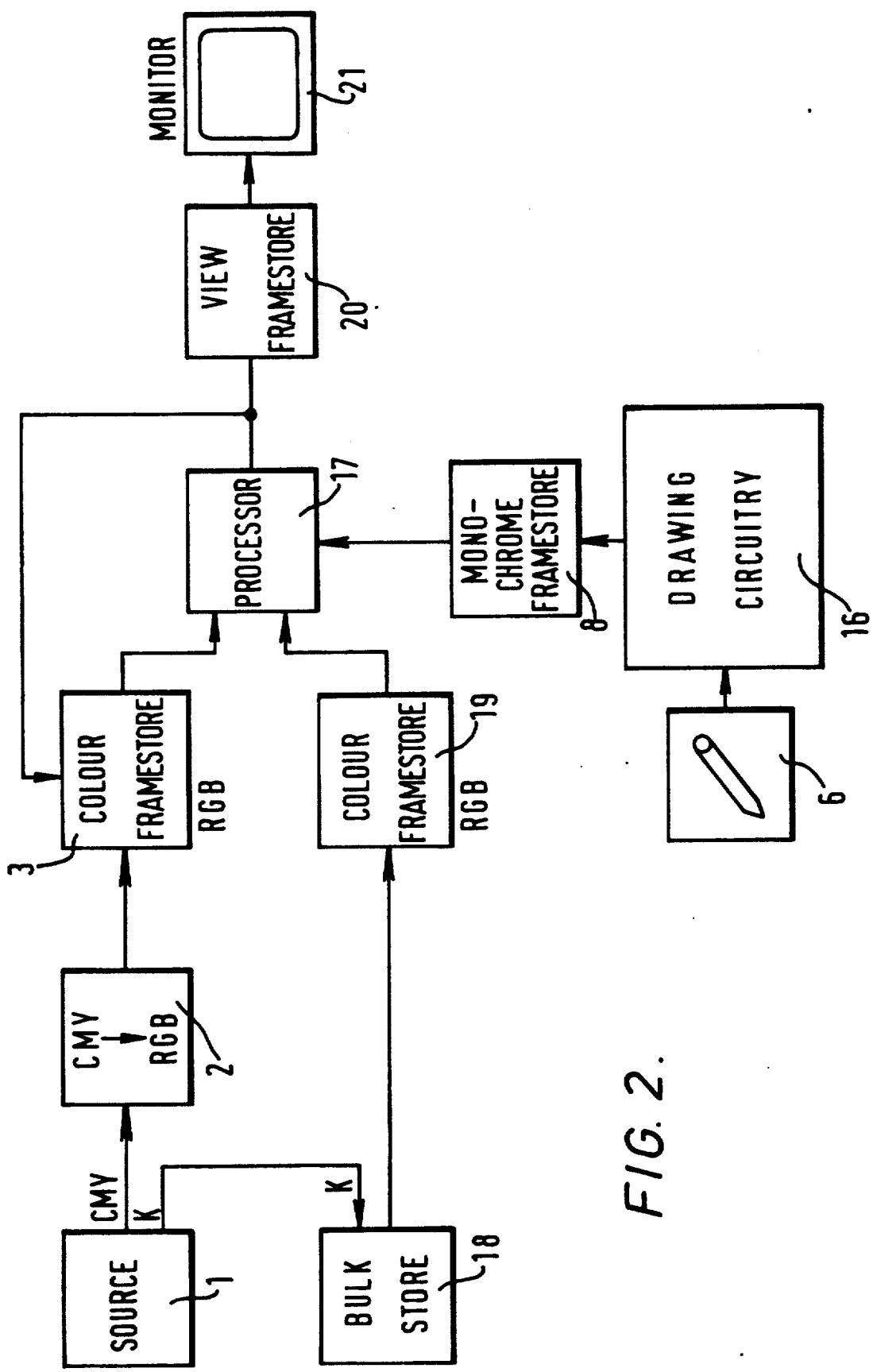
FIG. 2 is a schematic block diagram of an exemplary electronic graphic system according to the present invention.

Referring now to FIG. 2 of the accompanying drawings, there is shown a system according to the present invention. In the following description, those functional units of the system according to the present invention that perform the same functions as units described in relation to FIG. 1 are identified by the same numerical designation.

As in the system of FIG. 1 as above described, this system comprises a source 1 which delivers pixel data in CYMK format to a conversion matrix 2. Again, the conversion matrix 2 converts the CMY data into corresponding RGB data which is stored in a first colour framestore 3. Unlike the system in FIG. 1, this system is arranged to store the black (K) separation data in a bulk storage device 18 for use later on. While thus stored, data from the stores 3 and 19 can be combined. For the sake of simplicity the black separation data is illustrated as being delivered directly from the source 1 to the bulk storage device 18. However, it should be noted that in the practice of the invention the black separation data is delivered first to a monochrome framestore such as the first monochrome framestore 8 and from there is written to the bulk storage device 18.

The black separation data (after combining data from the stores 3 and 19 using the processor 17) can be placed into the monochrome framestore 8 where it can be modified simply by manipulation of the stylus and touch tablet combination. This manipulation will cause the drawing circuitry 16 to perform a read-modify-write operation on the black separation in the framestore 8, the black separation being displayed on the monitor 12 during the manipulation. Such an operation can be used to add information to or erase information from the black separation thereby for example enhancing the blackness in certain areas and/or reducing the blackness in other areas of the image when it is printed.

The system of FIG. 2 includes a stylus/touch tablet device 6 and associated drawing circuitry 16 as in FIG. 1 by which the user can draw a control image into a monochrome framestore 8. The control image is used by a processor 17 in combining the RGB data in the first colour framestore 3 with other RGB data from the second color framestore 19 and representing another image written from the bulk storage device 18 to the second colour framestore 19. However, it could also be data representing a user selected color. The processor 17 interpolates the original RGB picture data from the first framestore 3 and the other RGB data with the control image data being used as an interpolation coefficient 1 to determine the contribution from the original RGB picture data and the other RGB data. Again, modified pixel data output from the processor 17 is written to a view framestore 20 and from there to a monitor 21 for display in order to enable the user to view modifications as they are made.

It will be noted that the system according to the present invention as described so far is very similar to the system described above with reference to FIG. 1 of the drawings, a significant difference being that the black (K) separation data is retained by storage in the bulk storage device 18 for selective modification and subsequent use. One form of modification by the stylus/touch tablet 6 has already been described. However, other modes of operation are available. For example, once the user is satisfied with modifications made to the picture, the system is reconfigured to the arrangement shown in FIG. 3 of the accompanying drawings. The previously stored, i.e. original, black (K) separation data is written from the bulk storage device 18 to the first monochrome framestore 8 replacing the user defined control image data, which is no longer needed because satisfactory modifications to the original image have been completed. Of course, if it is envisaged that the user may require further use of the control image, the data for that image can be stored elsewhere, for example in the bulk storage device 18. At the same time, the black separation data for the modified image, as derived by the matrix circuit 23, is written to a second monochrome framestore 24 and the CMY data is written from the conversion matrix circuit 22 to the second colour framestore 19 and is stored there whilst modifications are made by the user to the black separation data.

Both the first monochrome framestore 8 and the second monochrome framestore 24 are connected to the processor 17 to enable the user to make modifications to either of the black separations held in those framestores. The modifications are made in a continuously cycling read-modify-write process similar to that above described in relation to FIG. 1, thereby avoiding the problem of jagged edges or aliasing in the resultant image. The resultant derived black separation is output by the processor 17 to the viewing framestore 20 for display on the monitor 21.

Thus, with the derived black separation displayed on the monitor 21 the user can interactively effect modifications to it by use of the stylus/touch tablet combination 6. Many modifications are possible using the features of our abovementioned electronic graphic systems. For example, the user may simply combine the original and the derived black separations by drawing with the stylus on the touch tablet to cause original separation data in the first monochrome framestore 8 to be "painted" onto the separation data in the second monochrome framestore 24. That is to say, original separation data is read from the first monochrome framestore 8 at addresses corresponding to the position of the stylus on the touch tablet and separation data is similarly read from the second monochrome framestore 24. The two sets of data are then interpolated by the processor 17 and the thus combined data output therefrom is written back to the second store 24. At the same time the combined data is written to the viewing store 20 for display on the monitor 21. In this way changes in tone between the original and modified parts of the image are adjusted by the user by changing the intensity of the black separation so that the intensity of areas of the separation data from the store 23 are blended at boundaries to match the intensity of areas of the original separation.

Of course the user may wish to combine the black separations from two original images, as opposed to the above described combining of an original image and a modified image. It will be appreciated that this can be done in the system shown in FIGS. 2 and 3 of the accompanying drawings simply by reading the respective original black separations for the two images directly into the monochrome framestores 8 and 24.

The system can also be arranged to enable the user to draw further information into, or erase information from, the separation data in the framestore 24, as required. In this mode of operation, when the user draws on the touch tablet with the stylus, derived separation data in the framestore 24 output from the drawing circuitry 16. The drawing data may add to or subtract from the separation data.

The derived separation data output is written both to the viewing framestore 20 for display and to the second monochrome framestore 24 to replace the data previously therein. In this way areas of colour in the image to be printed may be darkened by adding extra black to corresponding areas of the black separation or they may be lightened by removing black. This facility allows an experienced user to output areas of colour approximately to "Pantone" tints for example (Pantone being a proprietory standard defining a range of tints produced by particular inks) or similar standard tints where these have been specified in cyan, magenta, yellow and black percentages.

Similarly, spuriously generated areas of black or grey, for example at the boundaries between adjacent areas having complementary colour components, can also be removed by erasing these areas from the black separation.

Other modifications, per se well known using our electronic graphic systems, may also be effected to either the original or the derived black separations. The invention is intended to encompass these modifications also and is not limited to those examples described above.

Once satisfactory modifications to the black separation have been made, the black (K) separation data is output from the second monochrome store 24 and the colour CMY separation data is output from the second colour framestore 19. The output data may for example be delivered to a printer for printing of the modified image or to a bulk storage device for later use.

Figure 3:
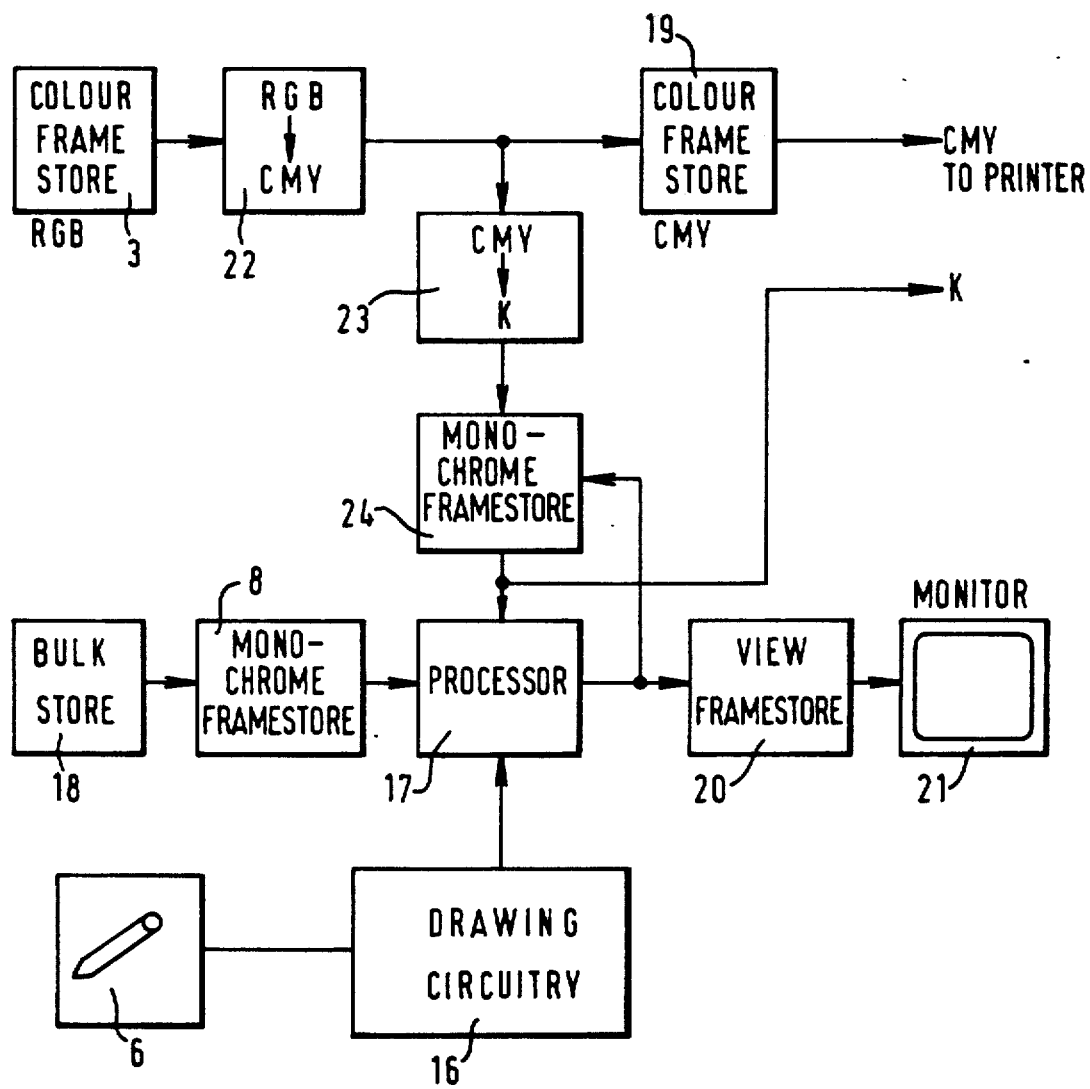
FIG. 3 is a schematic block diagram of the system of FIG. 2 showing further functional components of that system.

It will have been noted by those possessed of the appropriate skills that the configuration shown in FIG. 3 does not include means for storing a control image drawn by the user and that as a result any drawing using the stylus and touch tablet results in direct operations being performed on the black separations held in the first and second monochrome framestores 8, 24. However, our systems could be readily modified to allow storing of a control image as well as two black separations, and the invention is therefore not limited to systems without this additional facility.

Indeed, a user of suitable ability will be able to use the system as shown in FIGS. 2 and 3 to modify black separation data by way of a control image. This can be done for example by saving in the bulk store 18 the colour separation data for the images from the colour framestores 3, 19 and then writing the black separation data from the monochrome framestores 8, 24 into the colour framestores 3, 19. Once the black separation data has been transferred to the colour framestores it can be manipulated as if it were two colour images (with however two components at zero) under the control of a control image or stencil drawn into the stencil store 8 in the usual manner.

The above described preferred embodiment of the invention is able to allow the user to blend derived and original black separation data to provide a smooth transition between modified and unmodified portions of a printed image. The embodiment is also able to allow the user to modify black separation data by drawing further information to or erasing information from the black separation data held in a monochrome framestore. Thus, the user can modify the black separation using all of the standard well known features of our electronic graphic systems to give a black contribution to the final image which is different to that of the original image or that derived automatically by the system. Clearly, the images written in the stores 3 and 19 could, either or both, be images created or touched up by use of the stylus/touch tablet 6 and the drawing circuitry 16.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. A method of using an electronic graphic system to modify original black and color separation data defining an image, the method comprising the steps of:
   storing the original black separation data;
   modifying the original color separation data to produce modified color separation data;
   deriving black separation data from the modified color separation data;
   selectively modifying at least one of the original black separation data and the derived black separation data, to produce modified black separation data; and
   outputting the modified black separation data together with the modified color separation data.

2. A method as claimed in claim 1, comprising combining selectively the original black separation data and the derived black separation data to produce the modified black separation data.

3. A method as claimed in claim 2, including effecting at least some of said modifications by way of a stylus and touch tablet combination and associated drawing circuitry.

4. A method as claimed in claim 1, comprising:
   inputting the color separation data to the system in a CMY format;
   converting the input color separation data to an RGB format before modification thereof; and
   converting the color separation data back to the CMY format once modifications thereof have been effected.

5. A method as claimed in claim 4, including effecting at least some of said modifications by way of a stylus and touch tablet combination and associated drawing circuitry.

6. An electronic graphic system as claimed in claim 1, comprising displaying an image represented by the separation data on a monitor while carrying out at least one of said modification steps.

7. A method as claimed in claim 1, including effecting at least some of said modifications by way of a stylus and touch tablet combination and associated drawing circuitry providing outputs supplied to at least one of said modifying steps.

8. A method as claimed in claim 1, comprising combining selectively at least one of the original and the modified black separation data with other data to produce the modified black separation data.

9. A method as claimed in claim 8, including effecting at least some of said modifications by way of a stylus and touch tablet combination and associated drawing circuitry.

10. An electronic graphic system for use in modifying original black and color separation data defining an image, the system comprising:
   first monochrome storing means for storing the original black separation data;
   first color storing means for storing the original color separation data;
   modifying means for selectively modifying the original color separation data to derive modified color separation data;
   deriving means for deriving from the modified color separation data, derived black separation data;
   second monochrome store means for storing the derived black separation data;

means in said modifying means coupled to receive at least one of the original black separation data and the derived black separation data and to modify the received black separation data and thereby produce modified black separation data; and means for outputting the modified black separation data and the modified color separation data.

11. An electronic graphic system as claimed in claim 10, comprising display means for displaying image data during modification.

12. An electronic graphic system as claimed in claim 10, further comprising a stylus and touch tablet combination and drawing circuitry coupled with said stylus and touch tablet and said modifying means to effect control over said modifications.

13. An electronic graphic system as claimed in claim 12, comprising display means for displaying image data during modification.

14. An electronic graphic system as claimed in claim 10, including means for inputting the color separation data in CMY format, the system further comprising converting means for converting said input color separation data between said CMY format and RGB format.

15. An electronic graphic system as claimed in claim 14, comprising display means for displaying image data during modification.

16. An electronic graphic system as claimed in claim 10, wherein the modifying means further comprises combining means for combining with other data at least one of the original color data, the modified color data, the original black separation data and the modified black separation data.

17. An electronic graphic system as claimed in claim 16, comprising display means for displaying image data during modification.

18. An electronic graphic system for use in modifying image data representing plural color separations of an image, the system comprising:

first storing means for storing initial image data representing the color separations of the image;

deriving means for deriving from said stored initial image data initial black separation data representing an initial black separation of the image;

second storing means for storing said initial black separation data independently from said stored initial image data; and modifying means for modifying the stored initial black separation data independently from the stored initial image data to create modified black separation data representing the black separation of the image after modification.

19. An electronic graphic system as claimed in claim 18, wherein the modifying means comprises means for modifying the stored initial image data to create modified image data representing the color separations of the image after modification.

20. An electronic graphic system as claimed in claim 19, wherein the deriving means comprises means for deriving further modified black separation data from said modified image data.

21. An electronic graphic system as claimed in claim 20, further comprising output means connected to said first and said second storing means for selectively outputting at least one of said initial and said modified image data together with at least one of said initial and said modified black separation data.

22. An electronic graphic system comprising:

image processing means for modifying an initial image represented by initial color separation pixel data and by initial black separation pixel data to create a modified image represented by modified color separation pixel data;

means for deriving black separation pixel data from the modified color separation pixel data created by said image processing means; and operator controlled modifying means for selectively modifying said derived black separation data, said operator controlled modifying means utilizing said initial black separation pixel data to modify selectively said derived black separation pixel data.

23. A system as claimed in claim 22, further comprising monitor means for displaying an image of the derived black separation pixel data effectively as it is modified.

24. A method comprising the steps of:

providing original black separation data and color separation data defining an image;

processing the original color separation data to produce modified color separation data;

storing the original black separation data while the original color separation data is being modified to derive the modified color separation data;

deriving a derived black separation data from the modified color separation data;

selectively modifying at least one of the original black separation data and the derived black separation data under user control to produce modified black separation data;

supplying both the modified black separation data and the modified color separation data to a utilization device.

25. A method as in claim 24, in which the supplying step comprises supplying the modified black separation data and the modified color separation data to a printer to print a modified image defined by both the modified black separation data and the modified color separation data.

* * * * *

UNITED STATES PATENT AND TRADEMARK OFFICE
CERTIFICATE OF CORRECTION

PATENT NO. : 5,225,817
DATED : July 6, 1993
INVENTOR(S) : Robert J. Long

It is certified that error appears in the above-indentified patent and that said Letters Patent is hereby corrected as shown below:

Title page, item [54], and col. 1, delete "ELETRONIC GRAPHIC SYSTEMS" and insert --ELECTRONIC GRAPHIC SYSTEMS--

Signed and Sealed this

Sixteenth Day of July, 1996

Attest:

BRUCE LEHMAN

*Attesting Officer*  *Commissioner of Patents and Trademarks*